United States Patent
Arik et al.

(10) Patent No.: US 10,180,074 B2
(45) Date of Patent: Jan. 15, 2019

(54) WIRELESS MONITORING SYSTEM

(76) Inventors: Mehmet Arik, Niskayuna, NY (US);
Kurtis Gifford McKenney, Somerville, MA (US); Scott Gayton Liter, Schnectady, NY (US); Samhita Dasgupta, Niskayuna, NY (US)

( * ) Notice: Subject to any disclaimer, the term of this patent is extended or adjusted under 35 U.S.C. 154(b) by 3038 days.

(21) Appl. No.: 11/275,188

(22) Filed: Dec. 16, 2005

(65) Prior Publication Data

US 2007/0139193 A1    Jun. 21, 2007

(51) Int. Cl.
*F01D 17/02*    (2006.01)

(52) U.S. Cl.
CPC .......... *F01D 17/02* (2013.01); *F05D 2260/80* (2013.01); *G05B 2223/06* (2018.08)

(58) Field of Classification Search
USPC ......... 340/870.17, 573.4; 702/130, 117, 184, 702/188, 104; 701/100, 31.6; 73/754, 73/112.06; 374/144, 141, 179
See application file for complete search history.

(56) References Cited

U.S. PATENT DOCUMENTS

| | | | | |
|---|---|---|---|---|
| 4,073,599 A * | 2/1978 | Allen | ..................... | F01D 5/187 416/232 |
| 4,136,516 A * | 1/1979 | Corsmeier | .............. | F01D 5/185 415/114 |
| 4,190,398 A * | 2/1980 | Corsmeier | ................ | F01D 5/18 415/114 |
| 4,215,412 A * | 7/1980 | Bernier et al. | ................ | 701/100 |
| 4,595,298 A * | 6/1986 | Frederick | ...................... | 374/144 |
| 4,604,031 A * | 8/1986 | Moss et al. | .................. | 416/97 R |
| 4,894,782 A * | 1/1990 | Alcock et al. | ................ | 701/100 |
| 4,940,976 A | 7/1990 | Gastouniotis et al. | | |
| 5,002,460 A * | 3/1991 | Lee | ......................... | F01D 5/188 415/115 |
| 5,018,069 A * | 5/1991 | Pettigrew | ...................... | 701/31.6 |
| 5,440,300 A * | 8/1995 | Spillman, Jr. | ............. | 340/10.34 |
| 5,517,464 A * | 5/1996 | Lerner et al. | ................... | 367/84 |
| 6,138,081 A * | 10/2000 | Olejack et al. | ............... | 702/104 |
| 6,304,176 B1 | 10/2001 | Discenzo | | |
| 6,466,858 B1 * | 10/2002 | Adibhatla et al. | ............ | 701/100 |
| 6,539,783 B1 * | 4/2003 | Adibhatla | .................. | 73/112.06 |
| 6,626,133 B2 | 9/2003 | Schell et al. | | |
| 6,667,725 B1 * | 12/2003 | Simons et al. | ................ | 343/895 |
| 6,747,572 B2 | 6/2004 | Bocko et al. | | |
| 6,898,540 B2 * | 5/2005 | Davies | ........................... | 702/85 |
| 7,034,711 B2 * | 4/2006 | Sakatani et al. | ........... | 340/686.1 |
| 7,050,943 B2 * | 5/2006 | Kauffman et al. | ............ | 702/188 |
| 7,197,430 B2 * | 3/2007 | Jacques et al. | ............... | 702/184 |
| 7,477,785 B2 * | 1/2009 | Reissman et al. | ............ | 382/221 |
| 7,693,643 B2 * | 4/2010 | Kim et al. | .................... | 701/100 |
| 2003/0224729 A1 | 12/2003 | Arnold | | |
| 2004/0078662 A1 | 4/2004 | Hamel et al. | | |
| 2004/0101022 A1 * | 5/2004 | Hardwicke et al. | .......... | 374/141 |
| 2004/0114666 A1 * | 6/2004 | Hardwicke et al. | .......... | 374/179 |
| 2004/0159103 A1 * | 8/2004 | Kurtz et al. | .................... | 60/772 |
| 2004/0211272 A1 | 10/2004 | Aronstam et al. | | |

(Continued)

*Primary Examiner* — Albert K Wong

(57) ABSTRACT

A system and method for remotely monitoring the operation of a turbine includes a remote device having a power module connected to a sensor and a transmitter. The remote device is powered by the power module and connected to a system such that the remote device is self-powered. The remote device wirelessly transmits information acquired by the sensor out of the turbine.

4 Claims, 3 Drawing Sheets

(56) References Cited

U.S. PATENT DOCUMENTS

| | | |
|---|---|---|
| 2004/0212510 A1 | 10/2004 | Aronstam |
| 2005/0024231 A1 | 2/2005 | Fincher et al. |
| 2005/0156751 A1 | 7/2005 | Seyfang et al. |
| 2005/0198967 A1* | 9/2005 | Subramanian .................. 60/803 |
| 2006/0070435 A1* | 4/2006 | LeMieux et al. ................ 73/168 |
| 2006/0118160 A1* | 6/2006 | Funahashi et al. ........ 136/236.1 |

* cited by examiner

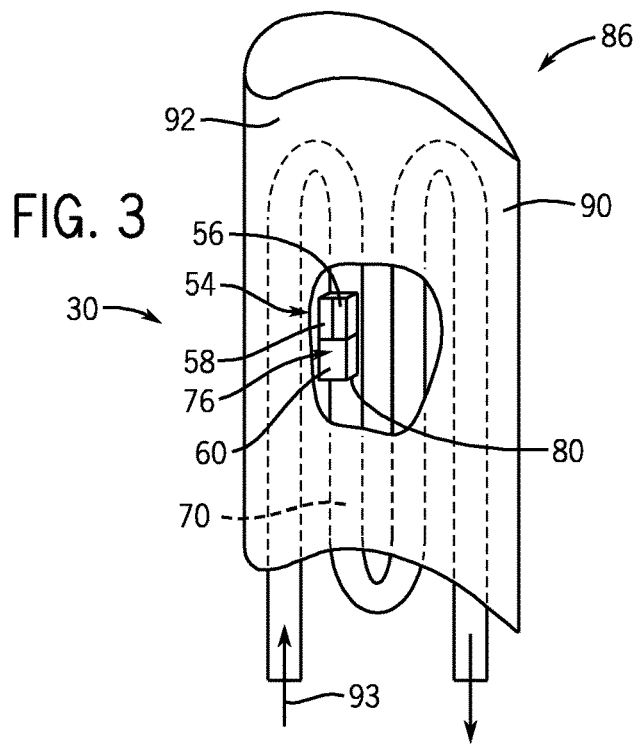
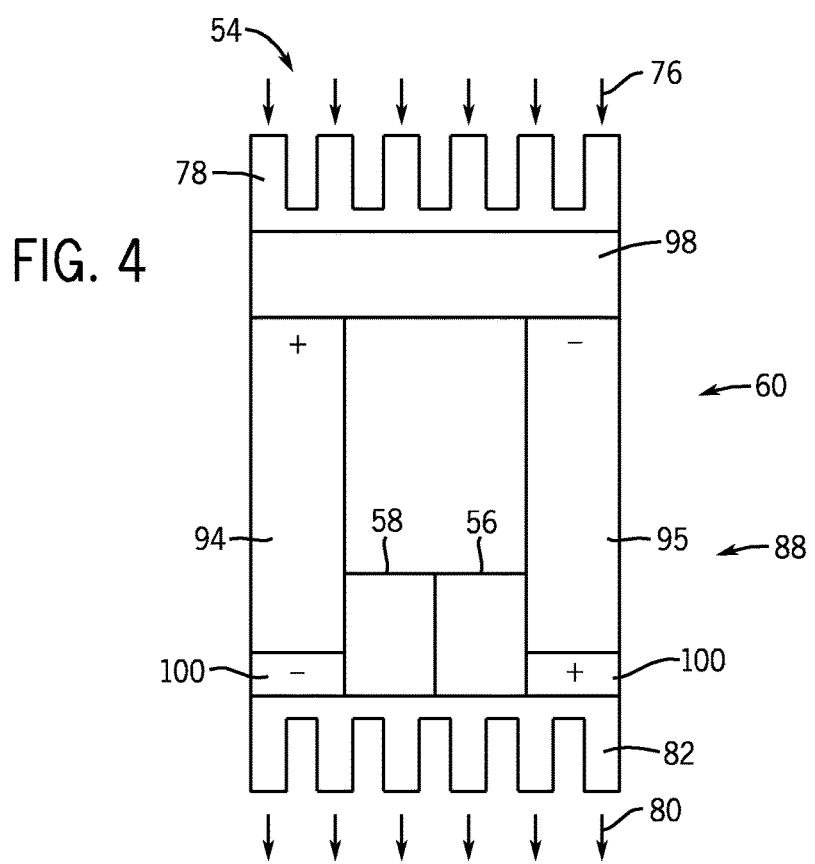

WIRELESS MONITORING SYSTEM

BACKGROUND OF THE INVENTION

The present invention relates generally to monitoring systems and, more particularly, relates to a self-powered remote sensor system configured to wirelessly communicate acquired data to a location remote from the sensor.

During operation of any multi-component system it is often desirable to acquire data associated with operation of such systems. From larger systems, such as turbine engines commonly employed in the fields of aviation and energy generation, to comparatively small devices such as compressors and/or pumps of household devices, it is often advantageous to acquire as much data as is practical in determining the operational condition and/or efficiency of the system/device. For larger systems such as the aircraft/utility turbine engines, the real-time operational data is generally acquired only periodically by connecting a plurality of interconnected sensors to the turbine. The sensors are often connected to a common power source and a data acquisition system. Due to the relatively complex wiring required to interconnect the plurality of sensors to the power source and data base, such data acquisition is often a time consuming and costly endeavor. Additionally, due to the relatively complex nature of the engine systems, extensive amounts of data associated with operation of the system is acquired. Such comprehensive testing of the engine is only periodic and must be ground based to support the complex wiring of the sensors and system components required to acquire the desired data. Accordingly, such systems are incapable of providing real-time or in-use operating data associated with operation of the engine.

Monitoring of smaller ground based components such as compressors, pumps, fans, and turbines could also benefit from enhanced operational monitoring. That is, similar to the larger systems, periodically equipping these devices with a sensor to determine the operational condition of the component is time and labor extensive. Often, a technician or service personnel must remove the target component from a larger apparatus, position a sensor configured to monitor a desired parameter in the component, connected a power source to the sensor, and maintain a sensor output connection and the power source connection during acquisition of the operational data, and then remove the monitoring system and reattach the target component to the apparatus. Such systems are labor and time intensive to implement.

Furthermore, the monitoring of rotating components of a system is particularly problematic. The acquisition of operational data associated with the rotational elements commonly involves the implementation of slip rings or other specially designed fixture elements to allow free rotation while ensuring connectivity between the sensor and the power source and database/control of the monitoring system. Such monitoring systems require extensive set-up and/or manufacture time to maintain the connectivity between the rotationally associated components. That is, acquiring data that is preferably monitored from either a sensor in direct contact with the rotating component or from a sensor position that is remote from an axis of rotation of the rotating component requires relatively complex fixturing to ensure connectivity between the sensor and the power source, a control, and an output display remote from the sensor.

Understandably, other non-rotational systems/devices suffer from similar drawbacks as discussed above. Regardless if the monitored apparatus includes rotational or moveable parts, the periodic connecting of the monitoring systems thereto is time consuming and labor intensive. Such monitoring procedures are ill-equipped to acquire data associated with in-use operation of the apparatus. That is, often the device, or subcomponent thereof, must be removed from service to allow connection of the monitoring system thereto. Such monitoring procedures decrease the operational efficiency of the monitored device by requiring that the device be removed from service, or its operational environment, during monitoring.

Furthermore, the periodic nature of such monitoring allows for an undesired operational condition to exist for an undesired duration. That is, if an undesired operational condition propagates shortly after completion of a periodic monitoring event, the undesired operational condition may not be discovered under a subsequent periodic monitoring event thereby allowing the device to operate under less than desired conditions. Such operation generally decreases the operation efficiency of the device and increases the potential of device damage or breakdown due to improper operation.

Therefore, it would be desirable to design a system and monitoring method capable of real-time in-use operational monitoring of a device.

BRIEF DESCRIPTION OF THE INVENTION

The present invention provides a system and method of wirelessly monitoring an operational condition of an apparatus that solves the aforementioned problems. The monitoring system includes a sensor configured to monitor a desired parameter of the apparatus, a power source, and a transmitter. The power source is configured to generate an electrical signal from an energy generated from operation of the apparatus and the transmitter is configured to wirelessly communicate data associated with the desired parameter from the apparatus.

Therefore, in accordance with one aspect of the present invention, a sensor system having a power module, a sensor, and a transmitter is disclosed. The power module is configured to generate an electrical signal from a non-operational energy generated by operation of a turbine and the sensor is connected to the power module and configured to monitor a condition of the turbine. The transmitter is attached to the sensor and powered by the electrical signal generated by the power module and configured to wirelessly transmit data acquired by the sensor remote from the turbine.

According to another aspect of the present invention, a turbine having a sensor positioned in a shroud and configured to monitor a condition of the turbine is disclosed. A transmitter is connected to the sensor and configured to transmit data acquired by the sensor. The turbine includes a power source configured to generate sufficient electrical energy to power the sensor and the transmitter from an energy of the turbine.

A further aspect of the present invention, a method of monitoring operation of a rotating engine component, is disclosed that includes converting an energy source generated by operation of a rotating engine into an electrical signal, acquiring data from a sensor powered by the electrical signal, and wirelessly transmitting the acquired data beyond the rotating engine.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 3 is a schematic representation of another location of the remote sensor unit in a turbine such as that shown in FIG. 1.

FIG. 4 is a cross-sectional schematic view of a power module of a remote sensor unit such as those shown in FIGS. 1-3.

DETAILED DESCRIPTION OF THE PREFERRED EMBODIMENT

Figure 1:
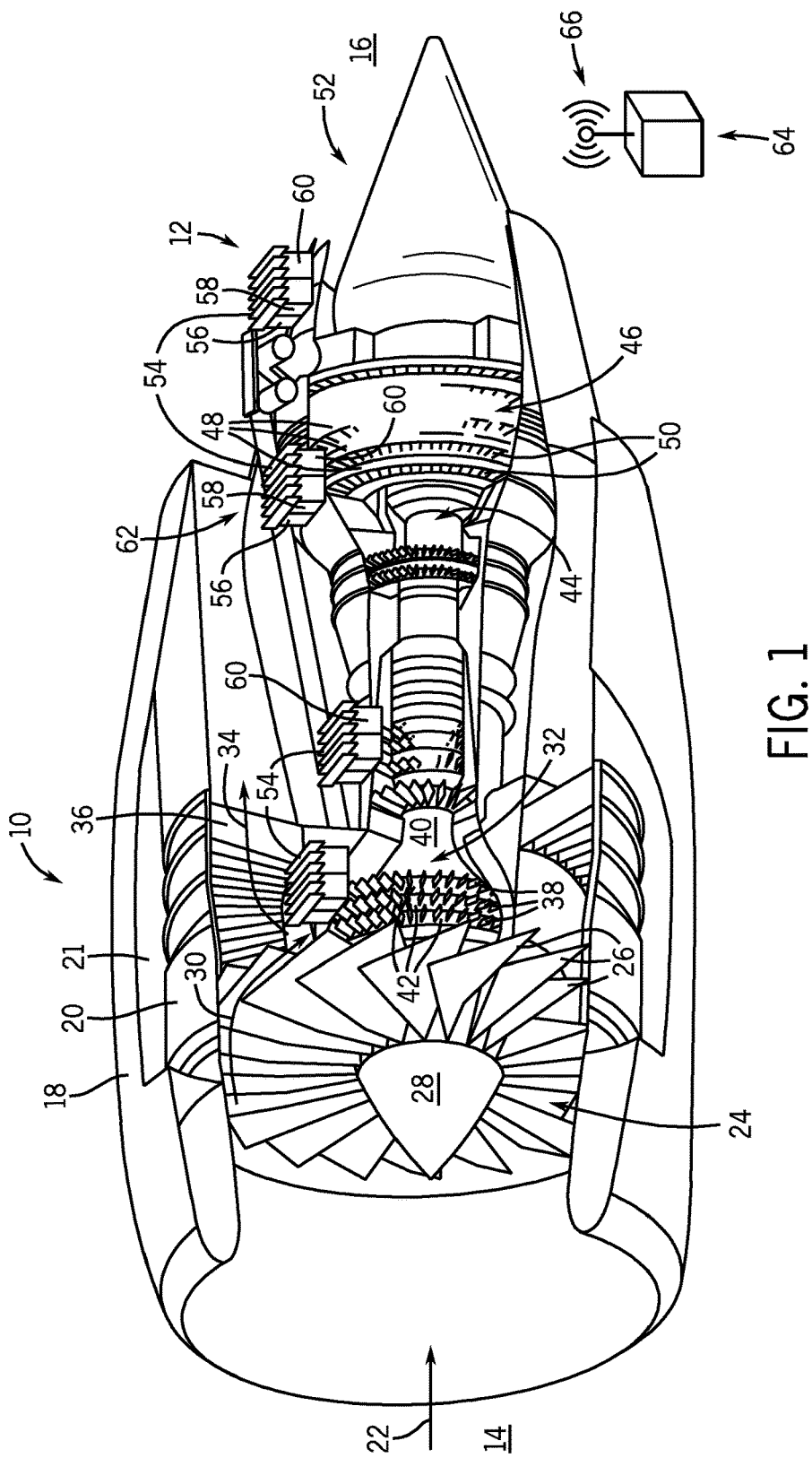
FIG. 1 is a perspective view of a turbine in partial cross-section having a remote monitoring system according to the present invention.

FIG. 1 shows a turbine 10 having a remote monitoring unit or system 12 according to the present invention. Turbine 10 includes an intake end 14 and a discharge end 16. A housing or shroud 18 is positioned about an exterior 20 of turbine 10 and includes a shroud cooling passage 21 formed therethrough. An air flow, indicated by arrow 22, enters turbine 10 through intake end 14 and passes through a first compressor stage or a fan 24. Fan 24 includes a plurality of blades 26 radially positioned about a hub 28. After air flow 22 has passed through fan 24, a first portion 30 of air flow 22 is directed to a compressor stage 32 and a second portion, or a bypass flow 34, of air flow 22 is directed through a perforated panel 36 and into shroud passage 21 thereby bypassing the remaining operational components of turbine 10.

Compressor stage 32 includes a plurality of fins or blades 38 attached to alternating stator hubs 40 and rotor hubs 42. During operation of turbine 10, blades 38 attached to each of rotor hubs 42 rotate past the blades 38 of adjacent stator hubs 40. The orientation of blades 38, the rotational speed of a particular hub as compared to adjacent hubs, and the shape of the blades, are selected to generate a desired increase in the pressure and velocity of air flow 30. Understandably, other hub configurations, such as a plurality of sequentially timed rotor hubs, are envisioned and within the scope of the claims.

The highly pressurized, increased velocity air flow 30 exiting compressor stage 32 is then directed to a combustor stage 44. Combustor stage 44 introduces a preferably highly atomized fuel to air flow 30. Combustion of the air/fuel mixture even further increases the pressure and velocity of air flow 30. Air flow 30 is then directed to a turbine stage 46 of turbine 10. Turbine stage 46 includes a plurality of hubs 48 wherein each hub 48 includes a plurality of blades or vanes 50. As air flow 30 passes through vanes 50 of each hub 48, a portion of the pressure and velocity of air flow 30 is utilized to rotate the respective hub 48. For the aircraft engine shown, one or several of hubs 48 are connected through concentric shafts to drive fan 24 and rotor hubs 42 of compressor stage 32. Air flow 30 exiting turbine stage 46 of turbine 10 augments the thrust of air flow 34 generated by fan 24 and is discharged from turbine 10 through a nozzle 52 positioned about discharge end 16.

Understandably, turbine 10 is merely exemplary. As one skilled in the art will appreciate, the components of turbines greatly vary depending on the intended application of the turbine. That is, an aircraft turbine engine may have a different configuration of components and parts than hydroelectric, geothermal, or other application specific turbine engines/generators. Specifically, the construction of the turbine is commonly tailored to the fluid passed therethrough, the operational environment of the turbine, and the intended use of the turbine. For example, a turbine intended to generate electrical power may include a turbine stage having a first set of hubs utilized to rotate the rotors of the compressor stage and another set of hubs utilized to drive a utility generator. Regardless of the intended application of the turbine, the operating conditions of the turbine must be monitored to assess the operational efficiency of the engine and the condition of the respective components of the engine.

As shown in FIG. 1, monitoring system 12 includes a plurality of remote monitoring or sensor units 54. Each remote sensor unit 54 includes a wireless sensor 56 connected to a transmitter 58 and a power module 60 that in turn includes a power supply. Sensor 56 is connected directly to power module 60 thereby reducing the potential for failure of the connection therebetween. Power module 60 is constructed to generate an electrical signal from a non-operational energy generated by the operation of turbine 10. The power module 60, transmitter 58, and sensor 56 may be constructed as a combined single printed circuit board as a unitary package or other device, or may be constructed of separate components connected bodily or with wires. Further, power module 60 can be configured to power a plurality of sensors connected thereto. The electrical signal is sufficient to power sensor 56 and transmitter 58. Preferably, power module 60 is a thermoelectric or thermionic device constructed to generate an electrical signal from a temperature differential or gradient that power module 60 is subjected to during operation of turbine 10. Power module 60 is preferably constructed to generate a power signal from the energy of the thermal gradients associated with operation of turbine 10.

Understandably, power module 60 could be constructed to generate the desired electrical power signal from other non-operational energy sources, other than a temperature based gradient, such as, for example, a piezoelectric based energy, a kinetic based energy associated with turbine operation, and/or a photovoltaic based energy. Additionally, it is further understood that power module 60 is constructed to generate an electrical power sufficient to power the sensor or multiple sensors connected thereto. That is, one power module can be configured to power multiple sensors rather than providing a distinct power module for each respective sensor. Understandably, although such a system would allow a single power module to power several sensors, each of the several sensors must be connected to the single power module. The several sensors may be connected in parallel or series or some combination thereof.

As shown in FIG. 1, turbine 10 includes a plurality of remote sensor units 54 connected to turbine 10 at various locations thereof. Remote sensor units 54 are configured to acquire real-time operational data associated with operation of turbine 10 from a plurality of areas of interest thereof. Additionally, due in part to the self-supporting and compact nature of the plurality of sensor units 54, each sensor unit can be configured and connected to a plurality of sensors configured to monitor various parameters associated with the operation of turbine 10. That is, each sensor unit 54 is configured to monitor a parameter of interest proximate to the location of the sensor unit with respect to turbine 10. For example, a turbine stage sensor unit 62 is configured to monitor any of a pressure, a temperature, material stress/strain data, vibrational data, and combustion gas data, such as NOx and oxygen data generated by operation of turbine 10. That is, sensor 56 of remote sensing unit 62 is selected to monitor a particular parameter of interest. Alternatively, a given sensor 56 could be configured to monitor a plurality of conditions associated with operation of turbine 10. Sensors in the compressor could be used to gather information about the gas (air) before the combustor, for example to measure humidity for conditions when fogging is used or when rain is present, or oxygen content at different altitudes. As one of ordinary skill in the art will appreciate, the scale of remote sensor units 54 to turbine 10 has been modified for illustration and is not necessarily representative of an actual scale therebetween.

During operation of turbine 10, transmitter 58 wirelessly transmits data acquired by sensor 56 to a controller 64 having a receiver 66. Transmitter 58 may also include an optional receiver for receiving control signals from an optional remote transmitter integrated with, or separate from, receiver 66. Understandably, optional receiver improves the operational control of remote sensor units 54. Monitoring system 12 is thereby configured to provide real-time, in-use monitoring of turbine 10. For example, during flight of an aircraft equipped with turbine 10, remote sensor units 54 are configured to acquire data associated with operation of the turbine, and wirelessly communicate the data acquired by sensors 56 via communication connectivity between transmitter 58 and receiver 66 of controller 64. Preferably, controller 64 is positioned in the aircraft powered by turbine 10 in a feedback loop such that controller 64 can be configured to control operation of the turbine based, in part, on the real-time in-use data communicated thereto by remote sensor units 54. Alternatively, controller 64 could be remote from the aircraft equipped with turbine 10 for longer distance transmission of the output of monitoring system 12 or controller 64 could be configured to include a signal amplifier and/or relay transmitter for longer distance transmission of the output of monitoring system 12. Regardless of the location of controller 64, remote monitoring system 12 provides real-time in-use monitoring of turbine 10.

Figure 2:
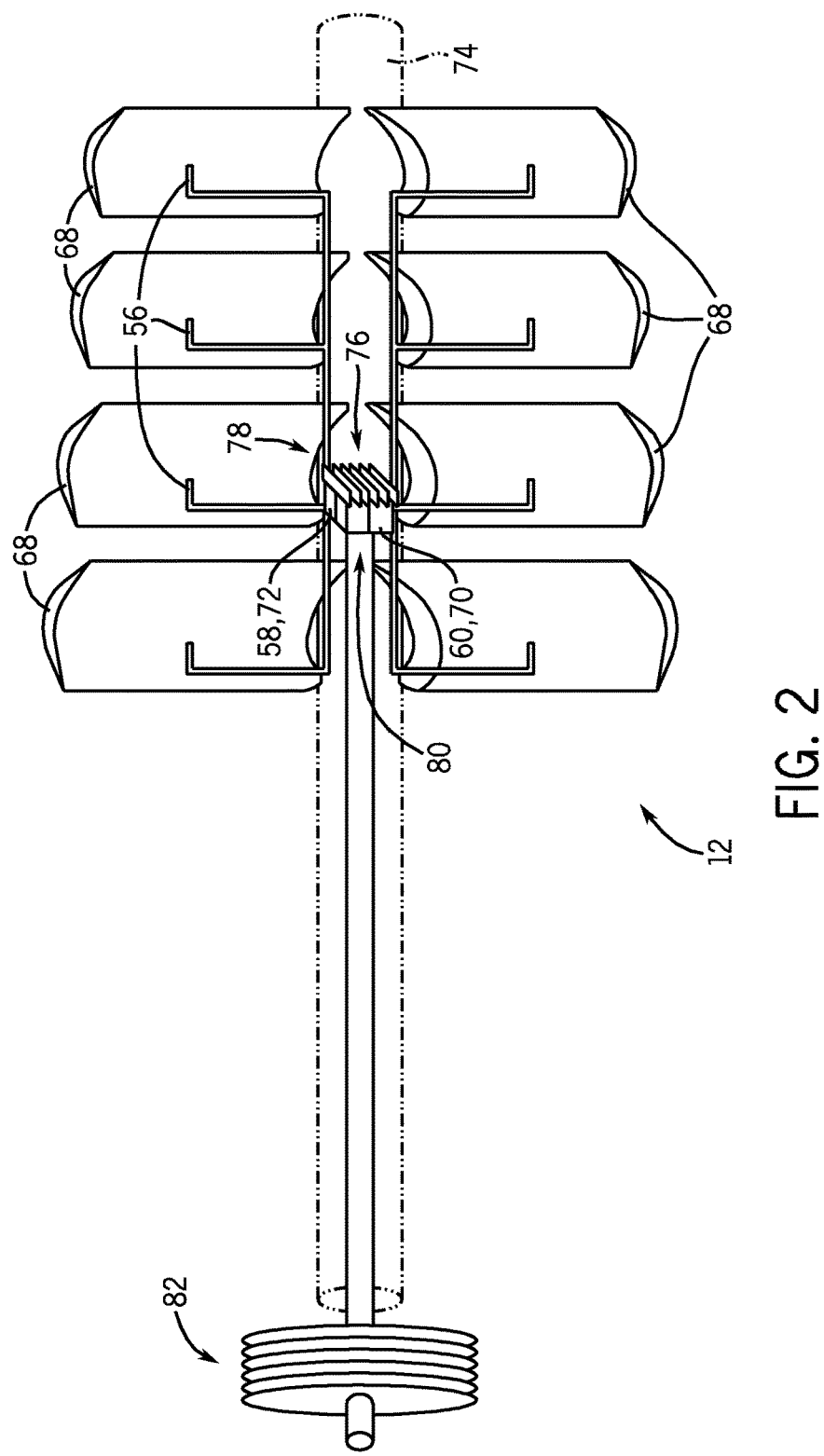
FIG. 2 is a schematic representation of one location of a remote sensor unit in a turbine such as that shown in FIG. 1.

As shown in FIG. 2, remote monitoring system 12 is configured to monitor the operational condition of a plurality of compressor blades 68. A plurality of sensors 56 are connected to a single power module 60 having a transmitter 58. Power module 60 is constructed to generate an electrical signal sufficient to power each sensor of the plurality of sensors 56 and the transmitter 58. That is, the size, location, composition, and construction of the power module are selected such the output of the power module is sufficient to power the type and number of sensors and the transmitter connected thereto. Furthermore, the location of the power module is selected to ensure that the power module is subjected to a gradient sufficient to allow generation of the required electrical signal.

As shown in FIG. 2, power module 60 is connected to a shaft 74 of turbine 10. Shaft 74 is driven by the turbine stage of turbine 10 and has plurality of compressor blades 68 connected thereto such that rotation of shaft 74 rotates compressor blades 68 attached thereto, and thereby pressurizes the flow of gas through compressor stage 32 of turbine 10. Each of the plurality of sensors 56 is connected to power module 60 and is configured to communicate a monitored parameter thereto. That is, sensors 56 could be selected to monitor any of a temperature or pressure of the fluid flow through the compressor section, a temperature of the respective compressor blade 68, a stress or strain associated with rotation, thermal loading, and/or aerodynamic loading of the blade, and/or vibrational data and/or noise data associated with operation of the turbine. Understandably, these are but a few examples of the data that can be acquired by sensors 56. The type and number of sensors 56 connected to power module 60 determines in part the size, type, and construction of power module 60.

As shown in FIG. 2, power module 60 is a temperature-difference based power module and is configured to generate an electrical power signal sufficient to power the plurality of sensors 56 and transmitter 58 connected thereto. That is, power module 60 is constructed to generate sufficient electrical power to power each of the components connected thereto. A "heat-in" side 76 of power module 60 includes an optional heat exchanger 78 connected thereto to improve the non-operational-energy harvesting capability of power module 60. A "heat-out" side 80 of power module 60 is connected to a heat exchanger 82 to maintain an adequate thermal gradient across power module 60. Understandably, a smaller temperature difference can be utilized to generate a desired electrical signal to power all of the components connected to power module 60 through utilization of heat exchangers 78, 82.

As shown in FIG. 3, remote sensor unit 54 can be located in turbine 10 such that sufficient electrical power can be generated thereby without heat exchangers 78, 82. Remote sensor unit 54 is attached to a fin, vane, or blade 86 of turbine 10. Blade 86 includes a body 90 having a passage 70 formed therethrough. Passage 70 allows passage of a coolant flow, usually a gas flow, indicated by arrow 93, through body 90 of blade 86 to remove heat from the blade during operation of turbine 10. Understandably, sensor unit 54 can be attached to blade 86 such that heat-in side 76 and heat-out side 80 are directly exposed to the flow over blade 86 and through passage 70, respectively, or maintained with a desired layer of blade material therebetween. During operation of turbine 10, an outer surface 92 is subjected to the high pressure and temperature associated with the passage of flow 30 thereacross. The heat-in side 76 of power module 60 is exposed to a temperature associated with flow 30 and the heat-out side 80 of the power module 60 is exposed to a temperature associated with flow 93 through passage 70. Accordingly, power module 60 generates electrical power from a thermal gradient between flow 30 and flow 93. Sensor 56 of remote sensor unit 54 is powered by the electrical signal generated by power module 60 and monitors a condition associated with operation of turbine 10. Transmitter 58 is connected to power module 60 and sensor 56. Transmitter 58 wirelessly communicates the sensed data associated with the monitored condition to receiver 66 remote from turbine 10.

Blade 86 is rotationally attached to turbine 10 such that the blade rotates relative to the shroud during operation of the turbine. Remote sensor unit 54 allows expeditious, real-time, in-use monitoring of operation of the rotational parts of turbine 10. Remote sensor unit 54 is shown recessed in blade 86. Such an orientation allows remote sensor unit 54 to monitor an operational condition of turbine 10 with minimal interruption to air flow 30 therethrough. Understandably, other orientations such as permanently affixing remote sensor unit to surface 92 are envisioned and within the scope of the claims. For a turbine having 6-8 stages of rotors, preferably two blades per stage are equipped with remote sensor units 54 to provide operational data of turbine 10. Preferably, remote sensor unit 54 is affixed to blade 86 such that power module 60 is subjected to an energy gradient sufficient to generate a desired electrical signal with reduced interference of flow 30 through turbine 10, reduced initial implementation time, and negligible impact on the structural integrity of turbine 10 and of blade 86.

It is appreciated that remote sensor unit 54 can be attached to turbine 10 in any location where a heat gradient sufficient to generate the desired electrical signal exists. That is, it is understood that the power module be in thermal communication with any fluid flow or component where a desired temperature exists. For smaller power requirements, for example electrical signals of less than approximately 5 watts, the turbine engine walls generally provide sufficient thermal conduction to allow the power module to generate the desired power signal. Such selective placement of the power module allows elimination of the heat manipulation components such as the heat-in side heat sink. Such selective placement of the remote sensor unit simplifies construction and installation of the remote sensor unit.

FIG. 4 shows a cross-sectional view of power module 60. Power module 60 includes a plurality of semiconductor legs 88 disposed between heat-in side 76 and heat-out side 80 thereof. The plurality of semiconductor legs 88 include a desired number of n-type legs 94 and a desired number of p-type legs 95 which are coupled between a heat-in surface 98 and a heat-out surface 100 of power module 60. Optional heat exchanger 82 is thermally connected to heat-out surface 100 of power module 60. Understandably, another optional heat exchanger could be thermally connected to heat-in surface 98 to enhance the thermal capture thereof. In those applications where multiple n-type and p-type legs 94, 95 are desired, a plurality of legs 88 is used where the legs 94, 95 are coupled electrically in series and thermally in parallel to one another. In operation, heat generated by operation of turbine 10 is captured by heat-in surface 98, passes through plurality of legs 88 and is discharged from power module 60 at heat-out surface 100. An electrical signal is generated by the communication of thermal energy through the plurality of legs 88 and is delivered to sensor 56 and transmitter 58 of remote sensor unit 54. It is further understood and within the scope of the appending claims that rather than legs 94, 95, electrical power could be transferred by etching isolated conductive paths in the heat-in and the heat-out sides of the power module or by providing a plurality of thermally conductive paths connected through a series of electrically conductive members, such as nanowires, to generate the desired electrical signal from the non-operational energy source.

Remote sensor unit 54 is constructed to be connected to remote locations of simple and complex systems. The ability of remote sensor unit 54 to generate power from non-operational energy generated by operation of the system allows the remote sensor unit to acquire and deliver real-time in-use data associated with operation of the monitored device. The compact and robust nature of the sensor unit allows for continual data acquisition during operation of the underlying system. Additionally, as the sensor unit is self-powered, the sensor unit does not consume energy otherwise consumed during operation of the underlying system thereby allowing monitoring of the system without increasing the power demanded thereof. The wireless and self-powered nature of the sensor unit provides convenient monitoring of the operational condition of systems so equipped by eliminating the necessity of disassembly the system to install and or connect the remote sensor system thereto. Accordingly, operational data of any system or component equipped with remote sensor unit 54 can be quickly acquired and analyzed.

Therefore, in accordance with one embodiment of the present invention, a sensor system includes a power module, a sensor, and a transmitter. The power module is configured to generate an electrical signal from a non-operational energy generated by operation of a turbine and the sensor is connected to the power module and configured to monitor a condition of the turbine. The transmitter is attached to the sensor and powered by the electrical signal generated by the power module and configured to wirelessly transmit data acquired by the sensor remote from the turbine.

Another embodiment of the invention includes a turbine having a sensor positioned in a shroud and configured to monitor a condition of the turbine. A transmitter is connected to the sensor and configured to transmit data acquired by the sensor. The turbine includes a power source configured to generate sufficient electrical energy to power the sensor and the transmitter from an energy of the turbine.

A further embodiment of the invention includes a method of monitoring operation of a rotating engine component which converts an energy source generated by operation of a rotating engine into an electrical signal, acquires data from a sensor powered by the electrical signal, and wirelessly transmits the acquired data beyond the rotating engine.

The present invention has been described in terms of the preferred embodiment, and it is recognized that equivalents, alternatives, and modifications, aside from those expressly stated, are possible and within the scope of the appending claims.

What is claimed is:

1. A turbine comprising:
   a shroud;
   a compressor;
   highly pressurized air exiting said compressor;
   a combustor introducing highly atomized fuel to said pressurized air;
   a sensor positioned in the shroud and configured to monitor a condition of the turbine;
   a transmitter connected to the sensor and configured to transmit data acquired by the sensor; and
   a power source configured to generate sufficient electrical energy to power the sensor and the transmitter from thermal energy during operation of the turbine,
   wherein the transmitter further comprises a receiver constructed to wirelessly receive information from a location remote the turbine.

2. A turbine comprising:
   a turbine component;
   a sensor positioned in the turbine component and configured to monitor a condition of the turbine;
   a transmitter connected to the sensor and configured to transmit data acquired by the sensor; and
   a power source configured to generate sufficient electrical energy to power the sensor and the transmitter from thermal energy during operation of the turbine,
   wherein the transmitter further comprises a receiver constructed to wirelessly receive information from a location remote the turbine,
   wherein said power source is not electrically connected to any device external to said turbine, and
   wherein the power source is a thermoelectric device and is in thermal communication with at least two temperatures associated with at least two of a flow of gas through the shroud; a flow of gas through the turbine; a flow of gas through a cooling passage of at least one of a fin, a blade, and a vane; a thermal gradient across the power source by conduction heat transfer in a solid material of the turbine; and a thermal gradient directed to the thermoelectric device by at least one of a heat pipe and a high conductivity heat spreader.

3. A turbine comprising:
   a turbine component;

a sensor positioned in the turbine component and configured to monitor a condition of the turbine;
a transmitter connected to the sensor and configured to transmit data acquired by the sensor; and
a power source configured to generate sufficient electrical energy to power the sensor and the transmitter from thermal energy during operation of the turbine,
wherein the transmitter further comprises a receiver constructed to wirelessly receive information from a location remote the turbine,
wherein said power source is not electrically connected to any device external to said turbine, and
further comprising a heat exchanger attached to at least one of a heat-in side and a heat-out side of the power source.

4. A blade for a turbine engine, comprising:
a body, the body having an outer surface subject to a pressurized flow of a gas through the turbine engine and a passage formed in the body configured to allow passage of a flow of coolant through the body; and
a sensor package provided on the outer surface, the sensor package comprising:
 a sensor configured to monitor a condition associated with operation of the turbine engine;
 a power module configured to generate an electrical signal from one of a temperature differential and a temperature gradient during operation of a turbine; and
 a transmitter attached to the first sensor and powered by the electrical signal generated by the power module, the transmitter configured to wirelessly transmit data acquired by the first sensor remote from the turbine, wherein the power module generates the electrical signal from a thermal gradient or a temperature differential between the flow of coolant in the passage and the pressurized flow of gas on the outer surface,
wherein the power module comprises a heat-in surface, a heat-out surface, and a plurality of semiconductor legs between the heat-in and heat-out surfaces, the plurality of semiconductor legs including at least one n-type leg and at least one p-type leg that are coupled electrically in series and thermally in parallel, and
wherein the power module further comprises a first heat exchanger in thermal contact with the heat-in surface and a second heat exchanger in thermal contact with the heat out-surface.

* * * * *